Figure 1:
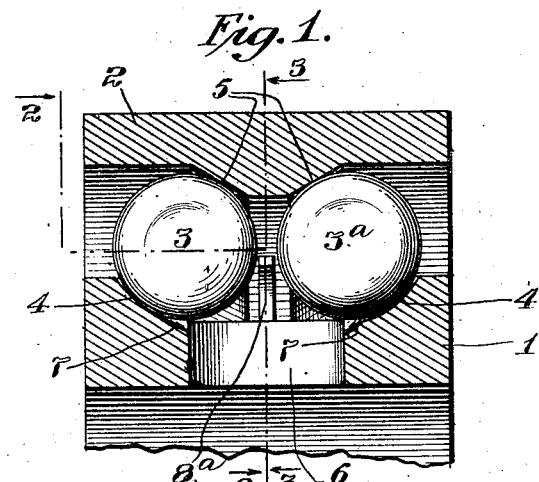

F. E. BRIGHT.
ANTIFRICTION BEARING.
APPLICATION FILED MAY 22, 1912.

1,072,080.

Patented Sept. 2, 1913.

Attest:

Inventor:
Fred E. Bright
by Rogers, Kennedy & Campbell Attys.

UNITED STATES PATENT OFFICE.

FRED E. BRIGHT, OF PHILADELPHIA, PENNSYLVANIA, ASSIGNOR TO THE HESS-BRIGHT MANUFACTURING COMPANY, A CORPORATION OF DELAWARE.

ANTIFRICTION-BEARING.

1,072,080.  Specification of Letters Patent.  Patented Sept. 2, 1913.

Application filed May 22, 1912. Serial No. 698,934.

*To all whom it may concern:*

Be it known that I, FRED E. BRIGHT, a citizen of the United States, residing at Philadelphia, in the county of Philadelphia and State of Pennsylvania, have invented certain new and useful Improvements in Antifriction-Bearings, of which the following is a specification, reference being had therein to the accompanying drawing.

This invention relates to anti-friction bearings of the type embodying inner and outer casing elements and two series of interposed rolling members. In a certain form of bearing of this general type, as set forth in an application for Letters Patent of the United States filed by me on the 11th day of June, 1909, Serial No. 501,531, the tracks on the two casing elements for the rolling members are uninterrupted and continuous, the rolling members, in the form of balls, being introduced into their raceways through a filling opening extending through the inner casing element between the ball tracks thereon, the sides of which filling opening terminate inward respectively of the ball tracks, so as not to interrupt them. In the introduction of the balls, they may be sprung into place in the raceways by being forced over the surfaces intervening between the edges of the filling opening and ball tracks, and after being once in place they will, under the usual and ordinary conditions encountered in the practical operation of the bearing, maintain their proper operative positions on the ball tracks. It may, however, happen that under certain conditions, one or more of the balls will lodge in or escape through the filling opening, and it is the aim of the present invention to avoid this objectionable action.

With this aim in view, the invention consists in the provision of a guard member, which is located between the two series of balls, and which is of such form that it will serve to prevent the accidental displacement of the balls from their tracks, or their passage into the filling opening. In its preferred embodiment this guard member is in the form of a split ring, loosely encircling the inner casing element between the two series of balls, so that it may be circumferentially movable, and spanning the filling opening in the casing element, the relation and form of the parts being such that when the ring is in such position that its split portion is opposite or in register with the filling opening, the balls may be forced past the ring into their proper position in the assembling operation, but when the ring is shifted circumferentially so that its split portion is removed from the filling opening and the continuous portion of the ring spans the same, the ring will act as a stop or guard for the balls, and will effectually prevent their displacement from their proper tracks or their accidental escape into the filling opening.

The guard member possessing the characteristics and functions mentioned, is not only effective in preventing the escape of the balls when the split portion of the same is out of register with the filling opening, but it will also be effective in less degree when the split portion of the ring is in register with the filling opening, because as it is necessary to force the balls through the split portion of the ring, in introducing the balls between the casing elements, a corresponding obstruction will be offered by the ring to the passage of the balls in the opposite direction, so that in whatever position the ring may be, it will to a greater or less extent, act as a guard against the escape of the balls.

Figure 2:
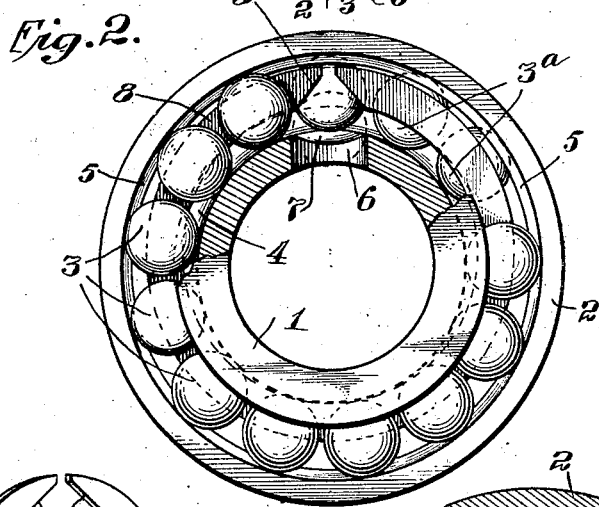
Figure 4:
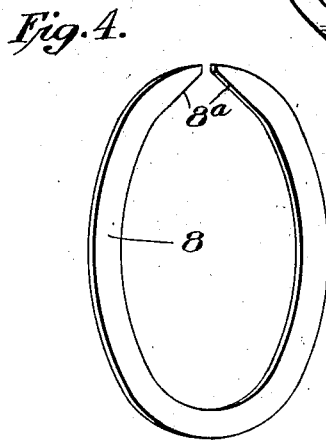
Figure 3:
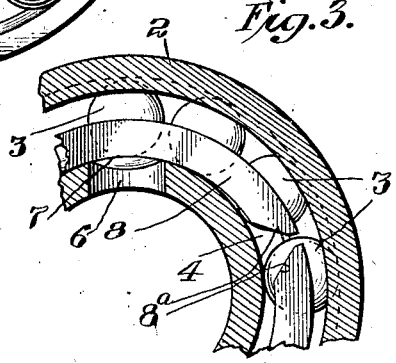

In the accompanying drawings: Figure 1 is a longitudinal section of an antifriction bearing having my invention applied thereto. Fig. 2 is a transverse central sectional elevation through the same, showing the guard ring with its split portion in register or opposite the filling opening. Fig. 3 is a similar view showing the ring changed in position circumferentially and with its continuous portion spanning the filling opening. Fig. 4 is a perspective view of the guard member.

The particular antifriction bearing shown, to which my invention is applied, consists of an inner casing element 1, an outer casing element 2, and two series of rolling members in the form of balls, 3, 3ᵃ. The inner casing element is provided with ball tracks, 4, 4, and the outer casing element is likewise provided with ball tracks 5, 5, which tracks constitute two raceways between the casing elements, in which the two series of balls, 3, 3ᵃ, travel on single lines of contact.

6 represents a filling opening for introducing the balls between the casing elements, which filling opening in the present instance, extends radially through the inner casing element and terminates at its sides at points inward respectively of the ball tracks 4, 4, so that the continuity of the ball tracks is not interrupted. This filling opening is shown as communicating with both raceways, and in the introduction of the balls, force is necessary to properly seat them in their raceways, and on their tracks, cut away surfaces 7 being provided between the outer edges of the filling opening and the ball tracks over which the balls are forced in their assemblage on the tracks. The balls in the form of the bearing shown may be introduced in two different ways, namely—first, with the casing elements in concentric relation one within the other, the balls of the two series may be introduced in succession through the filling opening and pushed over the intervening surfaces 7 to one side or the other, according to the series to which they belong, and in this manner both series properly assembled on their respective tracks; or second, the casing elements may be displaced axially and slightly overlapping, with one series of balls arranged between them, and after the casing elements have been brought to their proper concentric relation one within the other, the second series of balls may be introduced through the filling and forced into place.

In the operation of the bearing under usual and ordinary conditions, the balls will retain their proper positions in the raceways on their respective tracks, but it may sometimes happen under certain conditions, more particularly when the parts of the bearing are at rest, that one or more of the balls will leave its track and lodge in or escape through the filling opening. To prevent this objectionable action, I, in accordance with my invention, provide a guard member 8, preferably in the form of a split ring, which loosely encircles the inner casing element between the two series of balls, and spans the filling opening 6. The free ends of the ring at the split portion are beveled or inclined as at 8ª, so that the ring will present an opening which, when in register or opposite the filling opening, will permit the balls to be passed through the filling opening and into either race, by forcibly pressing the ends of the ring apart, but which when shifted circumferentially to a different position, with the continuous portion of the ring spanning the filling opening, will constitute a guard or obstruction and will prevent the passage of the balls through the opening. This ring constructed and arranged as shown, becomes effective as a guard mainly after both series of balls have been assembled, the ring being maintained by the two series of balls centrally over the filling opening and acting when in such position to effectually prevent the accidental displacement of the balls from their tracks, and their passage into the filling opening.

In the assemblage of the parts, the split ring is first slipped over the inner casing element, and if the first method of assemblage above mentioned is resorted to, the split portion of the ring is adjusted in register with the filling opening and the balls of the two series are introduced in succession into the filling opening and forced past the ends of the ring, the latter opening to permit their passage and springing back to their normal position after the balls have passed. The ring being freely movable circumferentially, may then be shifted in position to carry the split portion out of register with the filling opening, or this action will occur in the rotation of the parts of the bearing, and the ring will become effective as a guard with the functions and advantages above described. If the second method of assemblage above mentioned is resorted to, the ring as before, is slipped over the inner casing element, and the latter entered some distance concentrically within the outer casing element, with one series of balls between the casing elements in the position shown in Fig. 4. The inner casing element is then moved axially so as to occupy its proper position within the outer casing element, and with the split portion of the ring adjusted opposite the filling opening as before, the balls of the second series are passed in succession through the filling opening and forced between the free ends of the ring and seated in their raceway.

It will be observed that while the most effective position of the guard ring for preventing the displacement of the balls is when the split portion of the ring is adjusted out of register with the filling opening, yet by reason of the fact that with the split portion of the ring in register with the filling opening, force is required in pushing the balls between the ends of the ring, the latter is effective as a guard also in this position; so that whatever position the ring may occupy in a circumferential direction, it possesses the function of preventing the accidental displacement of the balls from their tracks and their passage into the filling opening.

In the drawings I have shown my invention applied in connection with a special and particular form of bearing and as embodied in the form which I prefer to adopt, and which in practice has been found to answer to a satisfactory degree the results to be attained. It is manifest, however, that the invention may be embodied in other forms and constructions such as will suggest themselves to the skilled mechanic, and may be employed in connection with bearings possessing other details of construction than that shown; and it will be understood that the invention is not limited to any particular form or construction of the parts except in so far as such limitations are specified in the claims.

Having thus described my invention, what I claim is:

1. In combination with an antifriction bearing comprising casing elements having two raceways and two series of interposed rolling members, one of said casing elements being provided with a filling opening between the raceways, and a guard member between the two series of rolling members in position to prevent their accidental escape through the filling opening and adapted to yield in the assemblage of the rolling members in the raceway.

2. In combination with an antifriction bearing comprising inner and outer casing elements having two raceways and two series of interposed rolling members, one of the casing elements being provided with a filling opening between the raceways, and a guard ring between the two series of rolling members in position to prevent the escape of the latter through the filling opening.

3. In combination with an antifriction bearing comprising inner and outer casing elements having two raceways and two series of rolling members, one of the casing elements being provided with a filling opening between the raceways, and a split guard ring between the series of rolling members.

4. In combination with an antifriction bearing comprising inner and outer casing elements having ball tracks constituting two raceways, and two series of rolling members traveling in said raceways, one of the casing elements being provided with a filling opening leading to the raceways, a loose guard ring between said series of rolling members, said guard ring being in position to span the filling opening and serving to prevent the accidental escape of the rolling members therethrough.

5. In combination with an antifriction bearing comprising inner and outer casing elements provided with ball tracks constituting two raceways between the casing elements, one of the casing elements being provided with a filling opening leading to the raceways, and two series of balls traveling in said raceways, and a circumferentially-movable guard ring situated between the series of rolling members in position to span the filling opening and prevent the escape of the rolling members therethrough.

6. In combination with an antifriction bearing comprising inner and outer casing elements having two raceways and two series of interposed rolling members, one of the casing elements being provided with a filling opening between the series of rolling members, and a circumferentially-movable guard ring situated between the series of rolling members in position to span the filling opening and prevent the escape of the rolling members therethrough.

7. In combination with an antifriction bearing comprising inner and outer casing elements having two raceways and two series of interposed rolling members, one of the casing elements being provided with a filling opening between the series of rolling members, and a circumferentially-movable guard ring situated between the series of rolling members in position to span the filling opening, said ring being so formed that when in one circumferential position relative to the filling opening, the balls may be passed through the filling opening, and when in another circumferential position relative to the filling opening, the passage of the rolling members therethrough will be prevented.

8. In combination with an antifriction bearing comprising inner and outer casing elements having two raceways and two series of interposed rolling members, one of the casing elements being provided with a filling opening between the series of rolling members, and a circumferentially-movable guard ring situated between the two series of rolling members in position to span said filling opening, said ring being formed with an opening adapted when in one position relative to the filling opening, to admit of the passage of the rolling members through the filling opening, and when in another position relative to the filling opening to prevent the passage of the rolling members therethrough.

In testimony whereof I have affixed my signature in presence of two witnesses.

FRED E. BRIGHT.

Witnesses:
C. L. McCalla,
C. S. Butler.